US012729658B2

(12) United States Patent
Durocher et al.

(10) Patent No.: US 12,729,658 B2
(45) Date of Patent: Sep. 8, 2026

(54) JET NOZZLE EFFECTIVE AREA CONTROL SYSTEM FOR GAS TURBINE ENGINE

(71) Applicant: Pratt & Whitney Canada Corp., Longueuil (CA)

(72) Inventors: Eric S. Durocher, Boucherville (CA); Michel Labrecque, Ste-Julie (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/812,775

(22) Filed: Aug. 22, 2024

(65) Prior Publication Data

US 2026/0055741 A1 Feb. 26, 2026

(51) Int. Cl.
*F02K 1/10* (2006.01)
*F02K 1/15* (2006.01)

(52) U.S. Cl.
CPC .................. *F02K 1/10* (2013.01); *F02K 1/15* (2013.01); *F05D 2240/128* (2013.01)

(58) Field of Classification Search
CPC ..... F02K 1/10; F02K 1/06; F02K 1/12; F02K 1/1207; F02K 1/15; F02K 1/645
See application file for complete search history.

(56) References Cited

U.S. PATENT DOCUMENTS 3,279,192 A 10/1966 Hull, Jr. et al.
3,380,663 A * 4/1968 Jumelle .................. F02K 1/123 239/265.41
3,615,052 A 10/1971 Tumavicus
3,785,567 A * 1/1974 Fisher ...................... F02K 1/06 92/48
3,967,443 A 7/1976 McMurtry
4,139,887 A 2/1979 Levesque, Jr.
4,147,027 A 4/1979 Greathouse
4,182,501 A 1/1980 Fage
5,181,676 A 1/1993 Lair
5,730,392 A 3/1998 Lair
6,688,099 B2 2/2004 Lair
8,276,364 B2 10/2012 Levasseur
(Continued)

FOREIGN PATENT DOCUMENTS

DE 102018122280 A1 3/2019
FR 3077847 A1 8/2019
FR 3109408 A1 10/2021

OTHER PUBLICATIONS

Non-final Office Action dated Aug. 27, 2025, in connection with U.S. Appl. No. 18/812,876, 23 pages.
(Continued)

*Primary Examiner* — Andrew H Nguyen

(57) ABSTRACT

A gas turbine engine for an aircraft includes an outer bypass section wall, and a jet nozzle including at least one inflatable diaphragm. The at least one inflatable diaphragm is disposed along the outer bypass section wall. The gas turbine engine also includes a fluid pressure sensor configured to measure a fluid pressure within the at least one inflatable diaphragm, an inlet valve configured to control a pressurized flow of a fluid into the at least one inflatable diaphragm in response to a command from a controller, and a release valve configured to control a release of the fluid from within the at least one inflatable diaphragm in response to a command from the controller.

18 Claims, 18 Drawing Sheets

(56) References Cited

U.S. PATENT DOCUMENTS

| | | | | |
|---|---|---|---|---|
| 8,615,982 | B2 | 12/2013 | Sundstrom | |
| 9,010,126 | B2 | 4/2015 | Stern | |
| 9,194,328 | B2 | 11/2015 | Gukeisen | |
| 9,416,752 | B2 | 8/2016 | Joshi | |
| 10,309,342 | B2 | 6/2019 | Mueller et al. | |
| 10,550,797 | B2 | 2/2020 | Howarth et al. | |
| 11,713,731 | B2 | 8/2023 | Gormley | |
| 11,994,087 | B2 | 5/2024 | Gormley | |
| 12,018,615 | B2 * | 6/2024 | Akcayoz | F02C 7/05 |
| 2003/0126856 | A1 | 7/2003 | Lair | |
| 2006/0213198 | A1 * | 9/2006 | Arbona | F02K 1/1207 60/771 |
| 2009/0208328 | A1 * | 8/2009 | Stern | F02K 1/10 60/226.3 |
| 2009/0235638 | A1 * | 9/2009 | Jain | F02K 1/15 60/262 |
| 2010/0139240 | A1 * | 6/2010 | Levasseur | F02K 1/085 60/226.3 |
| 2013/0146708 | A1 | 6/2013 | Vaughan | |
| 2013/0213006 | A1 | 8/2013 | Jones | |
| 2016/0010590 | A1 | 1/2016 | Rolt | |
| 2017/0074211 | A1 | 3/2017 | Smith et al. | |
| 2018/0045139 | A1 | 2/2018 | Kohlenberg et al. | |
| 2019/0162135 | A1 | 5/2019 | Channell | |
| 2021/0285399 | A1 | 9/2021 | Mickelsen | |
| 2021/0301760 | A1 | 9/2021 | Sutterfield et al. | |
| 2023/0213002 | A1 | 7/2023 | Gormley | |

OTHER PUBLICATIONS

European Search Report dated Feb. 10, 2026, in connection with European Application No. 25197459, 9 pages.

European Search Report dated Feb. 5, 2026, in connection with European Application No. 25197325.1, 9 pages.

European Search Report dated Jan. 21, 2026, in connection with European Application No. 25197446.5, 9 pages.

European Search Report dated Jan. 23, 2026, in connection with European Application No. 25197451, 9 pages.

Office Action dated May 20, 2026, in connection with United States U.S. Appl. No. 18/812,876, 26 pages.

Office Action dated Jun. 3, 2026, in connection with United States U.S. Appl. No. 18/812,857, 11 pages.

* cited by examiner

JET NOZZLE EFFECTIVE AREA CONTROL SYSTEM FOR GAS TURBINE ENGINE

TECHNICAL FIELD

This disclosure generally relates to gas turbine engines. More specifically, this disclosure relates to jet nozzle effective area control systems for gas turbine engines.

BACKGROUND

A gas turbine engine for an aircraft, such as a turbofan engine, may include a jet nozzle with an adjustable effective area. During engine operation, the effective area of the jet nozzle may be adjusted to enhance engine performance, efficiency, etc. Existing jet nozzle effective area adjustment mechanisms may employ multiple actuators, segmented panels, mechanical arms, pivot joints, etc. which add size, weight, and expense to the engine.

SUMMARY

This disclosure relates to jet nozzle effective area control systems for aircraft gas turbine engines.

In some examples, a gas turbine engine for an aircraft includes an outer bypass section wall, and a jet nozzle including at least one inflatable diaphragm. The at least one inflatable diaphragm is disposed along the outer bypass section wall. The gas turbine engine also includes a fluid pressure sensor configured to measure a fluid pressure within the at least one inflatable diaphragm, an inlet valve configured to control a pressurized flow of a fluid into the at least one inflatable diaphragm in response to a command from a controller, and a release valve configured to control a release of the fluid from within the at least one inflatable diaphragm in response to a command from the controller.

Any single one or any combination of the following features may be used with the examples above. The fluid may be compressed air. The inlet valve may be fluidly connected to receive the compressed air from a compressor of the gas turbine engine. The at least one inflatable diaphragm may be a single inflatable diaphragm having an annular shape. The at least one inflatable diaphragm may be configured to expand into the jet nozzle when the fluid pressure within the at least one inflatable diaphragm is increased such that an effective area of the jet nozzle is reduced. The at least one inflatable diaphragm may be configured to recede from the jet nozzle when the fluid pressure within the at least one inflatable diaphragm is decreased such that the effective area of the jet nozzle is increased. The at least one inflatable diaphragm may be disposed along a non-moving surface of the outer bypass section wall. The jet nozzle may include a plurality of hinged panels disposed adjacent to the at least one inflatable diaphragm along the outer bypass section wall of the gas turbine engine. The at least one inflatable diaphragm may be configured to deploy the plurality of hinged panels into the jet nozzle when the fluid pressure within the at least one inflatable diaphragm is increased such that an effective area of the jet nozzle is reduced. Each hinged panel from the plurality of hinged panels may have a tapered shape. Each hinged panel from the plurality of hinged panels may be configured to contact adjacent hinged panels from the plurality of hinged panels when the plurality of hinged panels is deployed into the jet nozzle. The at least one inflatable diaphragm may be configured to retract the plurality of hinged panels from the jet nozzle when the fluid pressure within the at least one inflatable diaphragm is decreased such that an effective area of the jet nozzle is increased. Each hinged panel from the plurality of hinged panels may be configured to seat within a recess defined within the outer bypass section wall when the plurality of hinged panels is retracted from the jet nozzle.

In other examples, a jet nozzle for a gas turbine engine for an aircraft includes at least one inflatable diaphragm configured to be disposed along an outer bypass section wall of the gas turbine engine. The at least one inflatable diaphragm is also configured to couple with a fluid pressure sensor configured to measure a fluid pressure within the at least one inflatable diaphragm, couple with an inlet valve configured to control a pressurized flow of a fluid into the inflatable diaphragm in response to a command from a controller, and couple with a release valve configured to control a release of the fluid from within the inflatable diaphragm in response to a command from the controller.

Any single one or any combination of the following features may be used with the examples above. The fluid may be compressed air. The at least one inflatable diaphragm may be configured to receive the compressed air, via the inlet valve, from a compressor of the gas turbine engine. The at least one inflatable diaphragm may be a single inflatable diaphragm having an annular shape. The at least one inflatable diaphragm may be configured to expand into the jet nozzle when the fluid pressure within the at least one inflatable diaphragm is increased such that an effective area of the jet nozzle is reduced. The at least one inflatable diaphragm may be configured to recede from the jet nozzle when the fluid pressure within the at least one inflatable diaphragm is decreased such that the effective area of the jet nozzle is increased. The at least one inflatable diaphragm may be configured to be disposed along a non-moving surface of the outer bypass section wall. The jet nozzle may include a plurality of panels configured to be hinged along the outer bypass section wall of the gas turbine engine adjacent to the at least one inflatable diaphragm. The at least one inflatable diaphragm may be configured to deploy the plurality of panels into the jet nozzle when the fluid pressure within the at least one inflatable diaphragm is increased such that an effective area of the jet nozzle is reduced. Each panel from the plurality of panels may have a tapered shape. Each panel from the plurality of panels may be configured to contact adjacent panels from the plurality of panels when the plurality of panels is deployed into the jet nozzle. The at least one inflatable diaphragm may be configured to retract the plurality of panels from the jet nozzle when the fluid pressure within the at least one inflatable diaphragm is decreased such that an effective area of the jet nozzle is increased. Each panel from the plurality of panels may be configured to seat within a recess defined within the outer bypass section wall when the plurality of panels is retracted from the jet nozzle.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which.

DETAILED DESCRIPTION

Figure 1A:
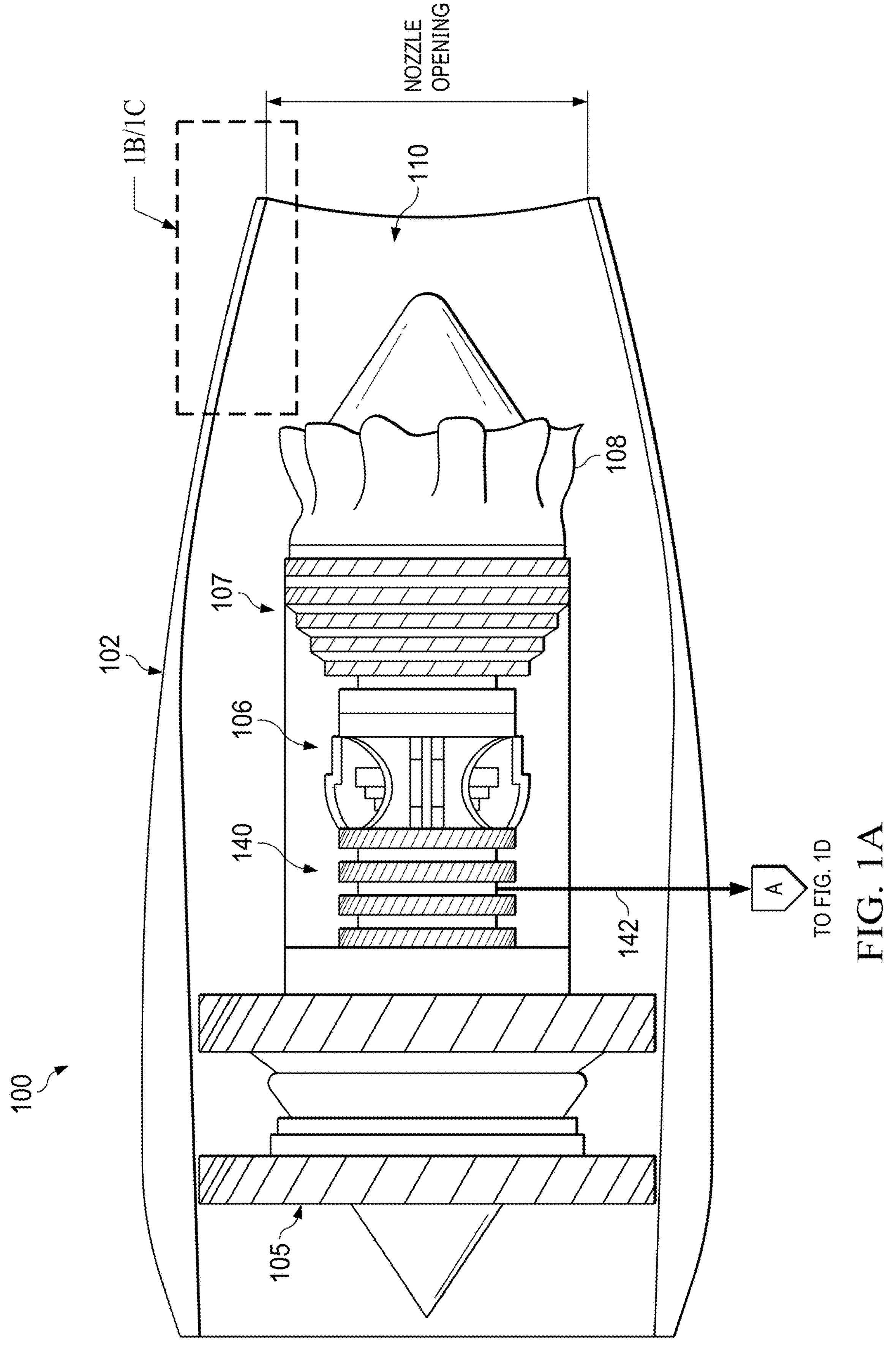
FIGS. 1A-1D illustrate an example gas turbine engine system in accordance with this disclosure.

FIGS. 1A through 7, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

As noted above jet nozzle effective area adjustment mechanisms for aircraft gas turbine engines may employ multiple actuators, segmented panels, mechanical arms, pivot joints, etc. which add size, weight, and expense to the gas turbine engine. The present disclosure provides example jet nozzle effective area adjustment mechanisms that have reduced size, weight, and/or mechanical complexity compared with existing mechanisms. The present disclosure also provides example methods for operating the example jet nozzle effective area adjustment mechanisms described herein.

FIGS. 1A-1D illustrate an example aircraft gas turbine engine (e.g., a turbofan engine) system 100 in accordance with this disclosure. It should be understood that the various views of FIGS. 1A-1D omit certain components of system 100 for clarity, but that system 100 may include the aggregate of the components illustrated in FIGS. 1A-1D. As shown in FIGS. 1A-1D, system 100 includes an outer bypass section 102, a controller 104, a fan 105, a combustor 106, a turbine 107, a mixer 108, an adjustable effective area jet nozzle 110, and a compressor 140. Jet nozzle 110 includes an inflatable diaphragm 112 disposed along an outer bypass section wall 130 of system 100. Inflatable diaphragm 112 may be constructed of an expandable material such as rubber, silicone, textiles, etc.

Figure 1B:
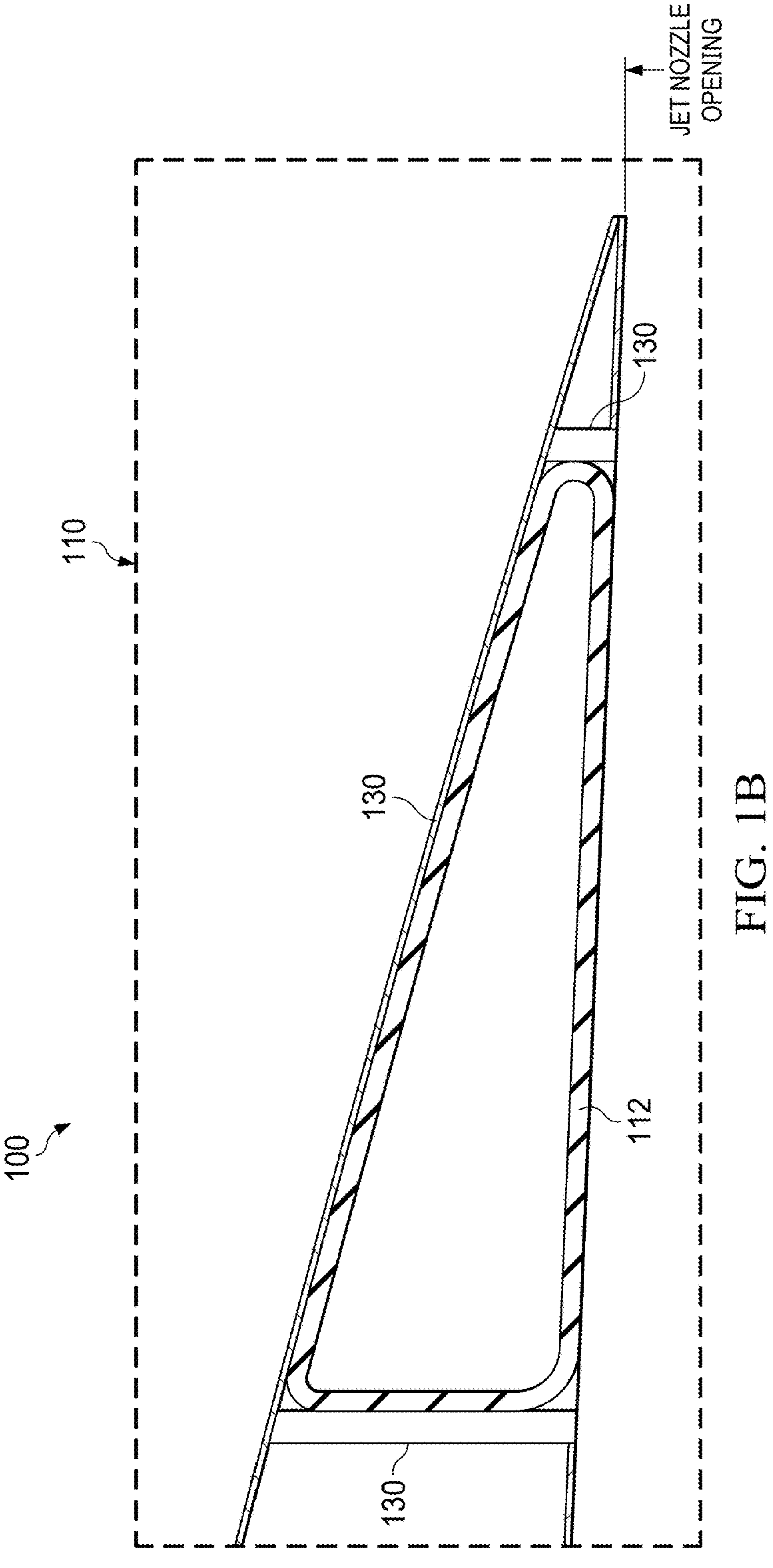
Figure 1C:
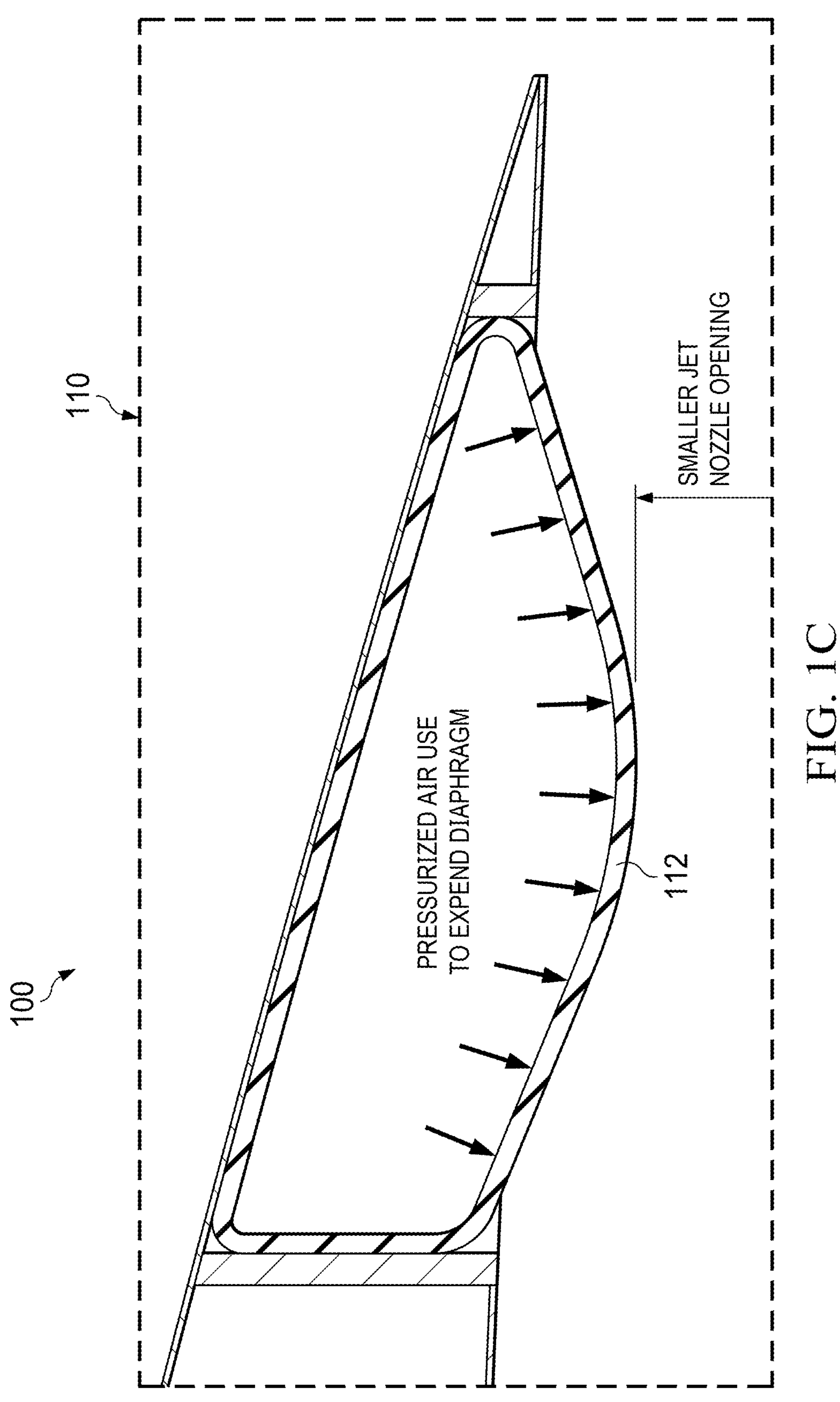

FIG. 1A depicts a cutaway view of system 100. During operation of system 100, fan 105 moves air through a core airflow path and a bypass airflow path that converge at jet nozzle 110. As can be seen in FIGS. 1A-1C, jet nozzle 110 has an adjustable effective area. The effective area of the jet nozzle is adjusted by increasing the pressure (i.e., inflating) or decreasing the fluid pressure (i.e., deflating) of a pressurized fluid within diaphragm 112. The fluid may be a liquid, such as hydraulic fluid, or a gas such as exhaust gas from the gas turbine engine, compressed ambient air, etc. As shown in FIGS. 1B-1C, which depict a partial view of jet nozzle 110, the effective area ("nozzle opening") of jet nozzle 110 decreases as the fluid pressure within diaphragm 112 is increased. FIG. 1B depicts diaphragm 112 as uninflated, while FIG. 1C depicts diaphragm 112 as at least partially inflated. In contrast with existing systems, where inflatable diaphragms may be employed to control engine flutter at high power and low speed, the inflation level of diaphragm 112 may be modulated during operation of system 100 to improve engine performance, efficiency, etc. when system 100 is operating at high speed, but with low power, for example, by decreasing the effective area jet of jet nozzle 110 during a cruise operating condition. In some embodiments, diaphragm 112 may be a single annular shaped (i.e., "donut" shaped) component disposed along outer bypass section wall 130. In other embodiments, diaphragm 112 may include a plurality of inflatable diaphragms disposed along outer bypass section wall 130. For example, each of the plurality of inflatable diaphragms may have a semi-annular shape, and form a combined annular diaphragm 112 when installed. In the example of FIGS. 1A-1D, outer bypass section wall 130 is a non-moving surface. That is, outer bypass section wall 130 is not configured to move during operation of system 100, though bypass section wall 130 may be configured to be moveable during non-operational events such as engine maintenance.

In the example of FIGS. 1A-1D, the fluid pressure within diaphragm 112 is adjusted by controller 104. To support adjustment of diaphragm 112, system 100 includes a fluid pressure sensor 120, an inlet valve 122, and a release valve 124. While depicted as an air pressure sensor, fluid pressure sensor 120 may be a type of appropriate sensor for measuring a pressure of the fluid utilized by system 100.

Figure 1D:
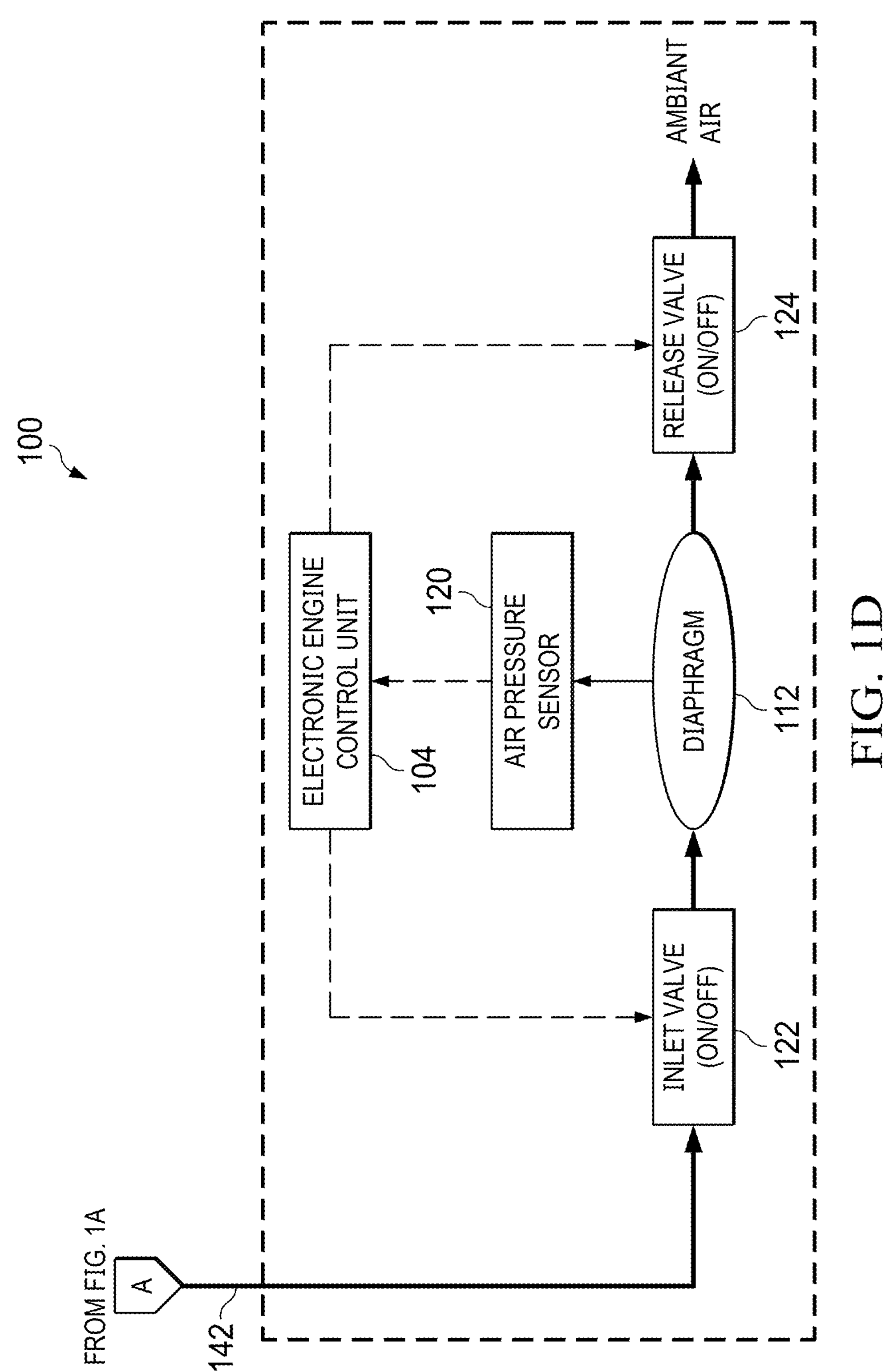

FIG. 1D illustrates a schematic view of an example control system for adjustment of diaphragm 112 by controller 104. As shown in FIG. 1D, diaphragm 112 is coupled to fluid pressure sensor 120, inlet valve 122 and release valve 124. During operation of system 100, Controller 104 monitors the fluid pressure within diaphragm 112 via fluid pressure sensor 120. If controller 104 determines that the fluid pressure within diaphragm 112 should be adjusted, controller 104 operates at least one of inlet valve 122 or release valve 124. Opening inlet valve 122 increases the fluid pressure within (i.e., inflates) diaphragm 112 by allowing a pressurized fluid such as bleed air 142 received from compressor 140 to enter diaphragm 112, causing diaphragm 112 to expand within jet nozzle 110. Opening release valve 124 decreases the fluid pressure within (i.e., deflates) diaphragm 112 by allowing the fluid within diaphragm 112 to escape into the ambient environment, causing diaphragm 112 to recede from jet nozzle 110. In some embodiments, controller 104 may provide operator feedback. For example, controller 104 may transmit feedback information for display, such as the currently commanded effective area of the jet nozzle or other relevant parameters.

Although FIGS. 1A-1D illustrate one example of a gas turbine engine system 100, various changes may be made to FIGS. 1A-1D. For example, while illustrated as receiving compressed air as bleed air 142 from compressor 140, inlet valve 122 may receive pressurized fluid from other fluidly connected sources, such as an auxiliary compressed air tank, an electric air compressor, a hydraulic pump, etc.

In the example of FIGS. 1A-1D, diaphragm 112 controls the effective area of jet nozzle 110 by directly entering the bypass air flow of system 100. While this provides a simple and weight reduced jet nozzle effective area adjustment mechanism, enhancements may be introduced to the example of system 100 such as illustrated in FIGS. 2A-2G to, for example, protect diaphragm 112 from foreign object damage (FOD), provide thermal shielding to diaphragm 112, provide better jet nozzle effective area control, etc.

FIGS. 2A-2G illustrate another example gas turbine engine (e.g., a turbofan engine) system 200 in accordance with this disclosure. It should be understood that the various views of FIGS. 2A-2G omit certain components of system 200 for clarity, but that system 200 may include the aggregate of the components illustrated in FIGS. 2A-2G. As shown in FIGS. 2A-2G, system 200 includes an outer bypass section 202, a fan 205, a combustor 206, a turbine 207, a mixer 208, an adjustable effective area jet nozzle 210, and a compressor 240. Jet nozzle 210 includes an inflatable diaphragm 212 disposed along an outer bypass section wall 230 of system 200. Inflatable diaphragm 212 may be constructed of an expandable material such as rubber, silicone, textiles, etc. Jet nozzle 210 also includes a plurality of panels 214 with hinges 216. In the example of FIGS. 2A-2G panels 214 attach to the wall of outer bypass section 202 adjacent to diaphragm 212.

Figure 2A:
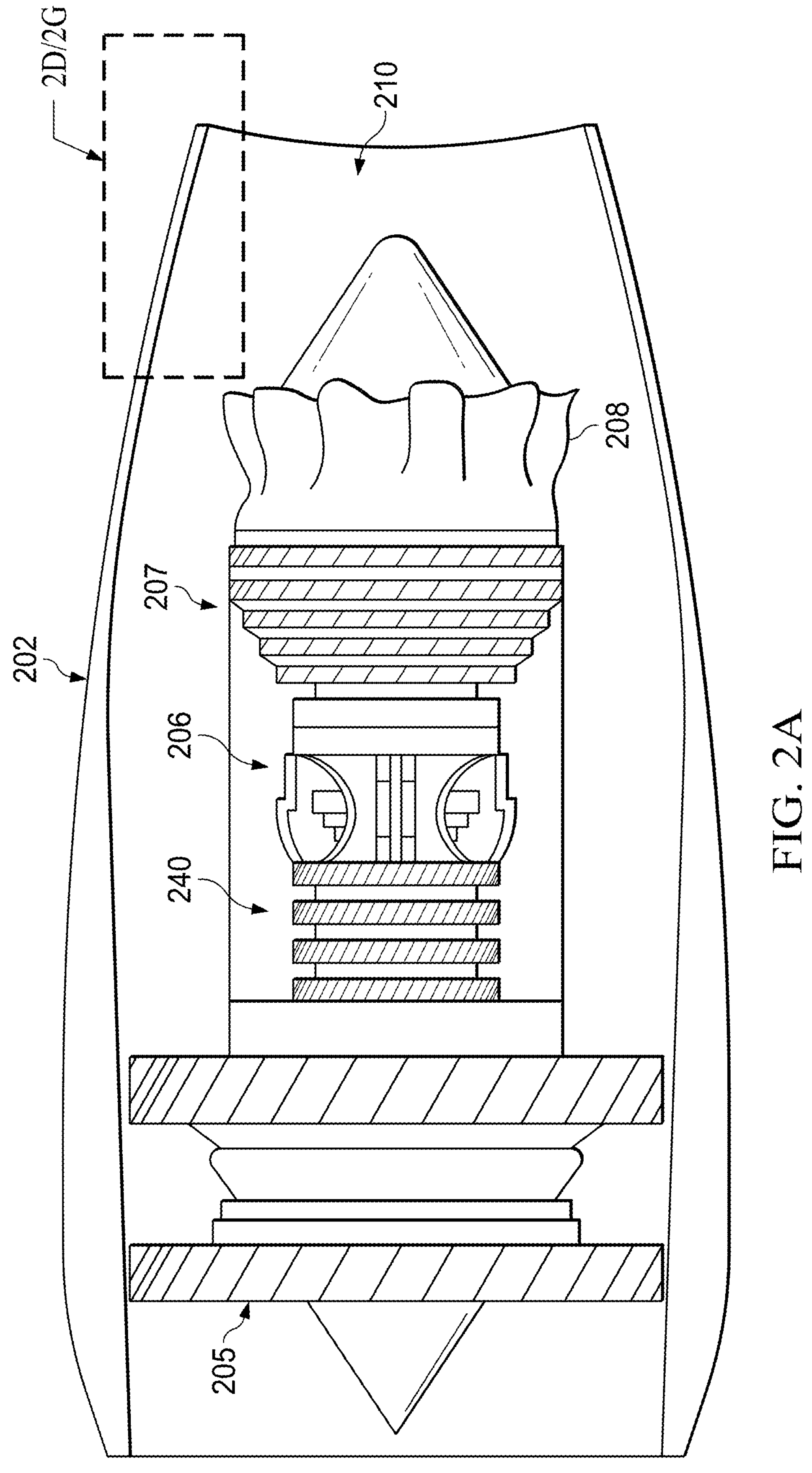
FIGS. 2A-2G illustrate another example gas turbine engine system in accordance with this disclosure.
Figure 2B:
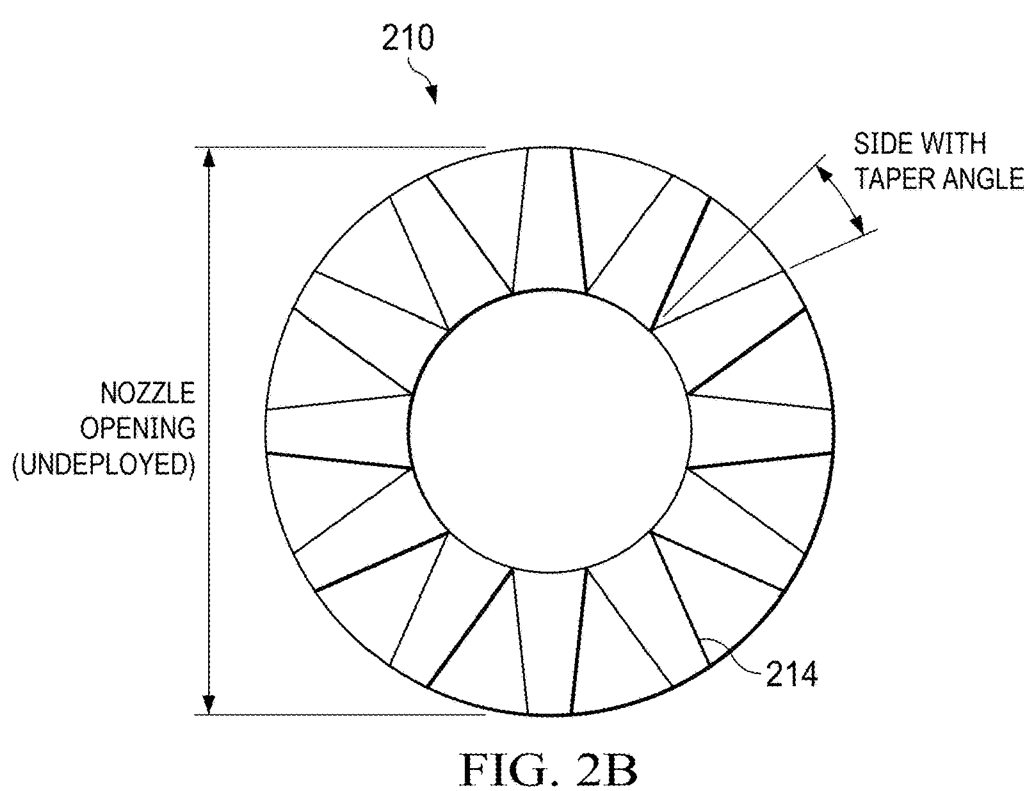
Figure 2C:
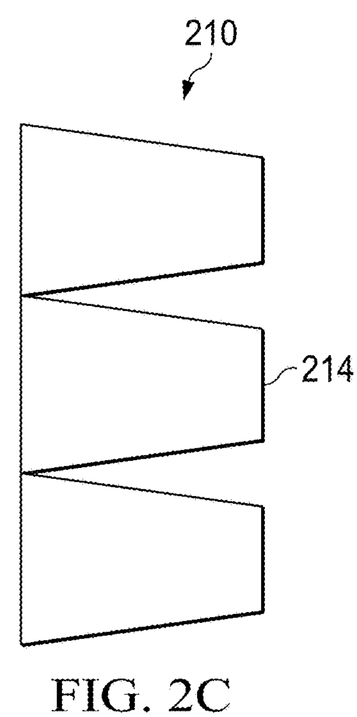
Figure 2D:
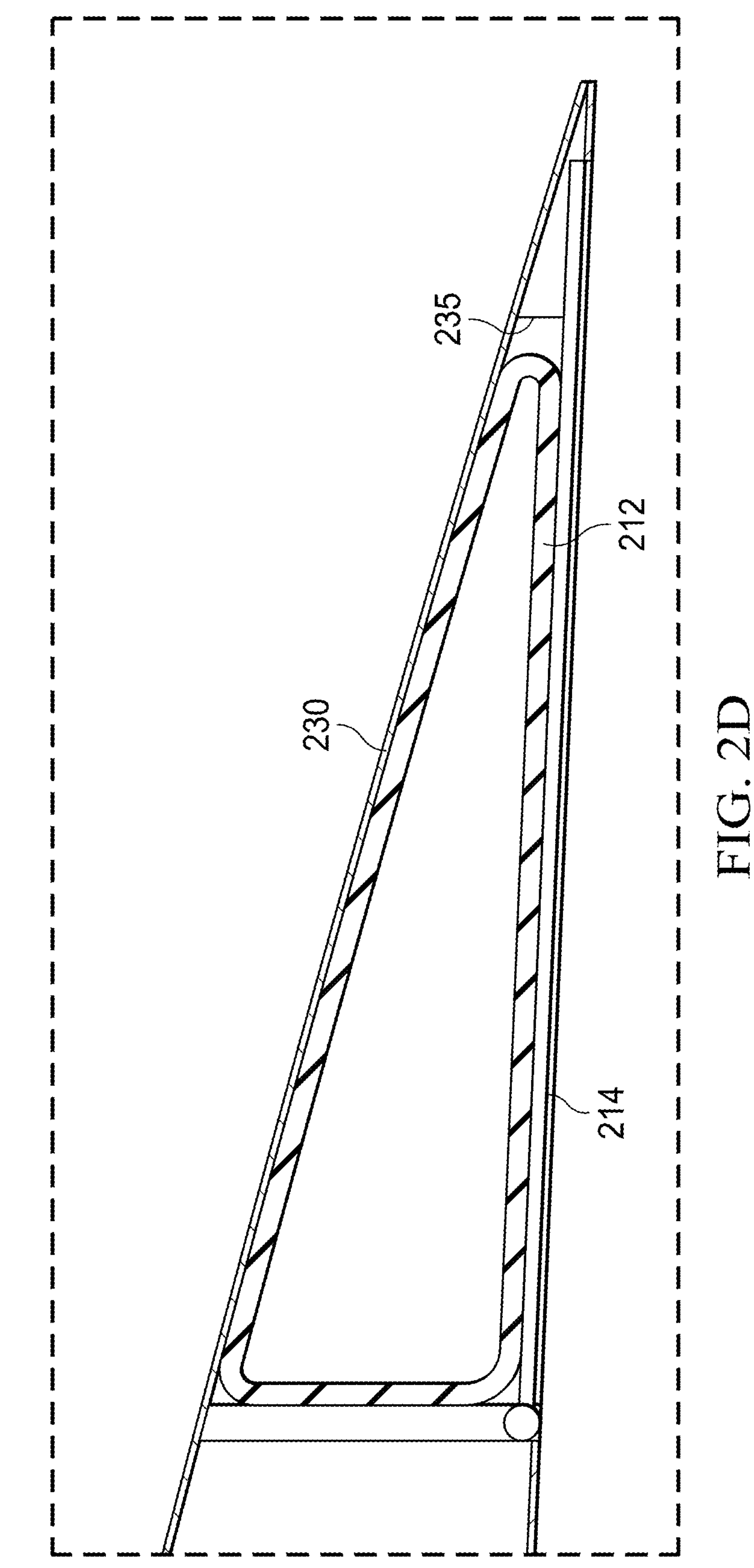
Figure 2E:
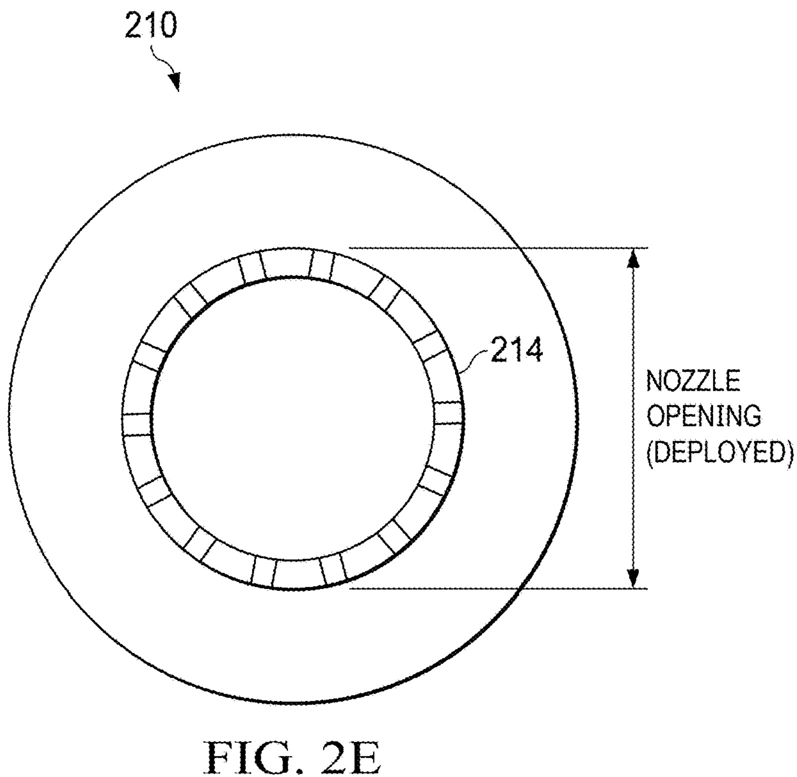
Figure 2F:
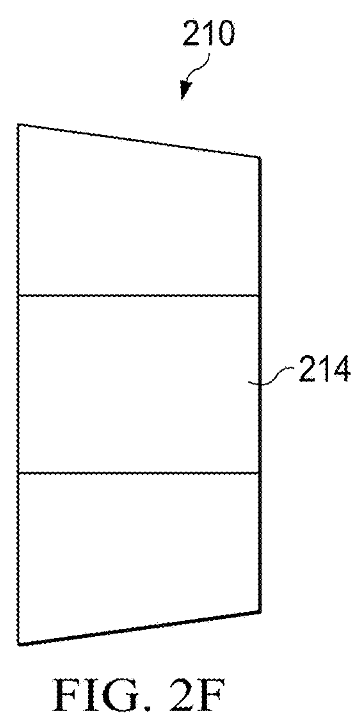
Figure 2G:
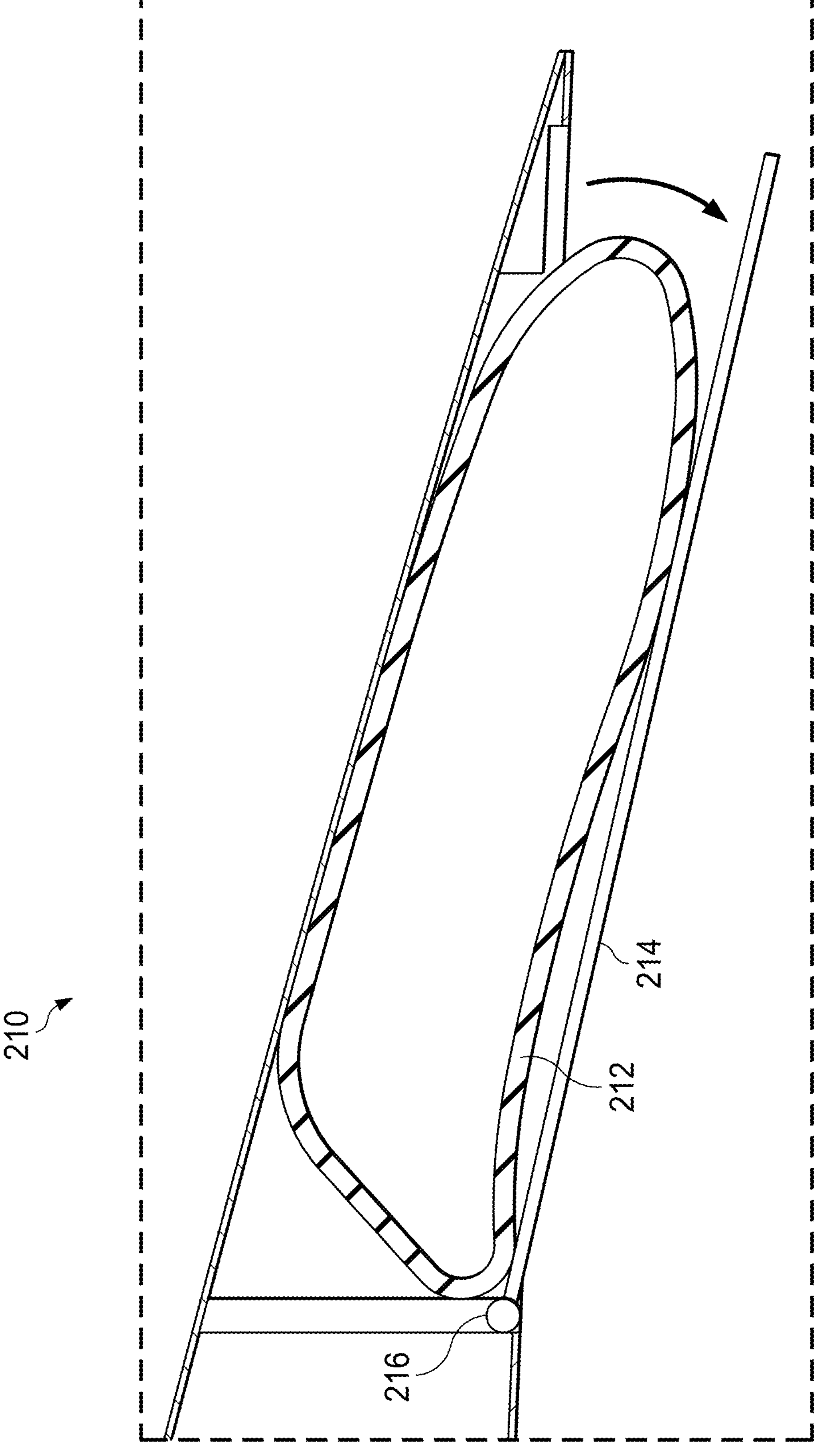

FIG. 2A depicts a cutaway view of system 200. During operation of system 100, fan 205 moves air through a core airflow path and a bypass airflow path that converge at jet nozzle 210. As can be seen in FIG. 2A, jet nozzle 210 has an adjustable effective area. The effective area of jet nozzle 210 is adjusted by increasing the fluid pressure (i.e., inflating) or decreasing the fluid pressure (i.e., deflating) of a pressurized fluid within diaphragm 212. Diaphragm 212 applies even pressure to each of panels 214. During operation of system 200, increasing the pressure within diaphragm 212 causes panels 214 to deploy into jet nozzle 210, while decreasing the pressure within diaphragm 212 causes panels 214 to retract from the jet nozzle 210. For example, panels 214 may be adhesively or mechanically coupled to diaphragm 212, the hinges 216 may be sprung, etc. As shown in FIGS. 2B-2G, which depict partial views of jet nozzle 210, the effective area ("nozzle opening") of jet nozzle 210 decreases as the fluid pressure within diaphragm 212 is increased. FIGS. 2B-2D depict diaphragm 212 as uninflated, while FIGS. 2E-2F depict diaphragm 212 as at least partially inflated. FIGS. 2B and 2E illustrate aft looking forward views of jet nozzle 210. FIGS. 2C and 2E illustrate partial side views of jet nozzle 210. FIGS. 2D and 2G illustrate partial cutaway side views of jet nozzle 210.

In some embodiments, diaphragm 212 may be a single annular shaped (i.e., "donut" shaped) component disposed along outer bypass section wall 230. In other embodiments, diaphragm 212 may include a plurality of inflatable diaphragms disposed along outer bypass section wall 230. For example, each panel 214 may be adjacent with a separate semi-annular shaped diaphragm 212. In the example of FIGS. 2B-2G, outer bypass section wall 230 is a non-moving surface. That is, bypass section wall 230 is not configured to move during operation of system 200, though outer bypass section wall 230 may be configured to be moveable during non-operational events such as engine maintenance.

As shown in FIGS. 2A-2G panels 214 have a tapered shape. The taper angle is sized to obtain the desired jet nozzle effective area when panels 214 are deployed, as when panels 214 are deployed, each of panels 214 contact the adjacent panels 214. When panels 214 are undeployed, each of panels 214 seat within a recess 235 within outer bypass section 202. This allows for a smooth passage of bypass air past panels 214 when panels 214 are undeployed, avoiding bullet drag and avoiding separating air locally.

While, not shown in FIGS. 2A-2G, the fluid pressure in diaphragm 212 may be adjusted similar as described regarding diaphragm 112. For example, system 200 may include various of controllers, fluid pressure sensors, valves, etc. similar as described regarding FIGS. 1A-1D to control the fluid pressure within diaphragm 212.

Although FIGS. 2A-2G illustrate one example of a turbofan engine system 200, various changes may be made to FIGS. 2A-2G. For example, while illustrated as having a particular number of panels 214 with a particular taper angle, system 200 may include any number of panels 214 with any taper angle.

Figure 3:
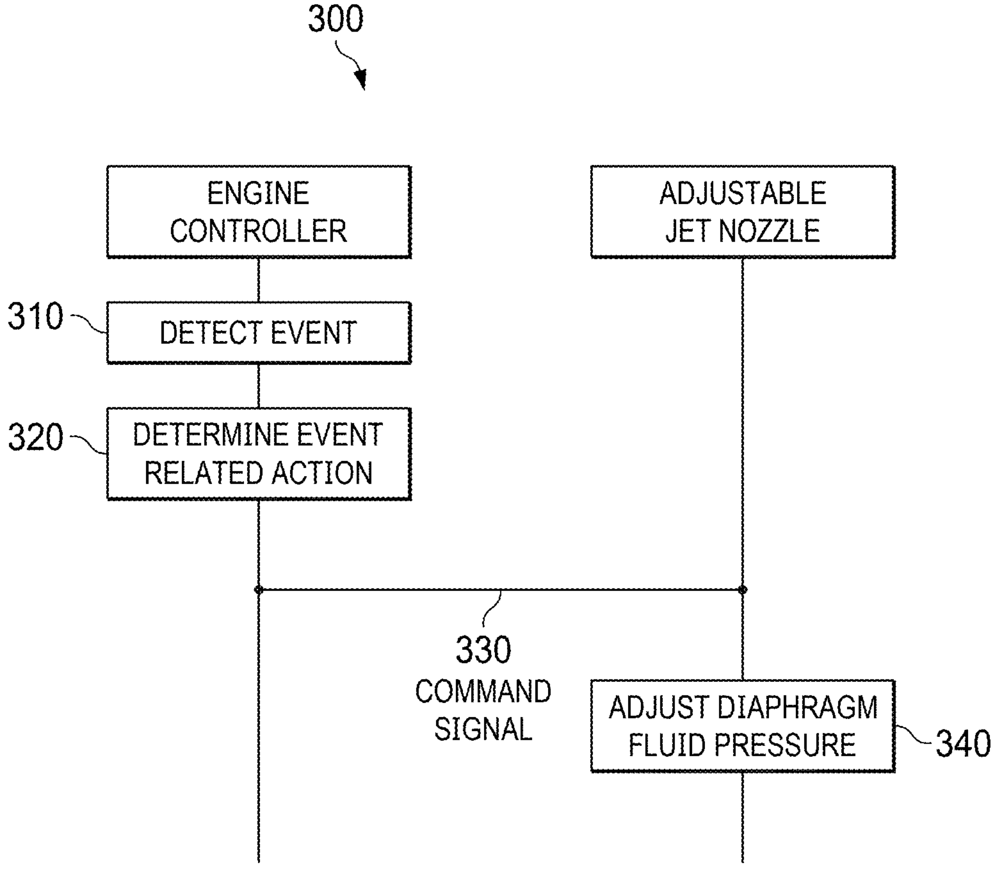
FIG. 3 illustrates an example method for adjusting an effective area of a jet nozzle in accordance with this disclosure.

FIG. 3 illustrates an example method 300 for adjusting an effective area of a jet nozzle in accordance with this disclosure. For ease of explanation, the method 300 shown in FIG. 3 may be described as being implemented or supported using a controller. However, the method 300 shown in FIG. 3 may be implemented or supported by any suitable device (s) and in any suitable system(s).

In the example of FIG. 3, method 300 begins at step 310. At step 310, a controller, such as controller 104 of FIG. 1D detects an event. For example, the controller may detect a cruise operating condition. At step 320, the controller determines an action to perform related to the detected event. For example, the engine may determine that an effective area of a jet nozzle should be reduced based on the cruise operating condition. At step 330, a control system for a jet nozzle that includes at least one inflatable diaphragm, such as jet nozzle 110 of FIGS. 1A-1D or jet nozzle 210 of FIGS. 2A-2G receives a command signal from the controller. For example, the command signal may indicate that the effective area of the jet nozzle should be reduced. At step 340, in response to receiving the command signal, the control system adjusts the fluid pressure within the at least on inflatable diaphragm. For example, the fluid pressure within the at least on inflatable diaphragm may be increased to reduce the effective area of the jet nozzle similar as described herein.

In some embodiments, the command signal may include a command to increase the effective area of the jet nozzle. For example, the command may be a response to detection of a non-cruise operating condition. In some embodiments, the command signal may be received in response to a detected change in fluid pressure within the inflatable diaphragm beyond the deadband of a setpoint. For example, ambient conditions may affect the fluid pressure within the diaphragm, and the controller may detect the change in fluid pressure. In some embodiments, the command signal may include a command to increase or decrease the pressure within the inflatable diaphragm to fall within the deadband of the setpoint.

In some embodiments, the control system may increase the fluid pressure within the inflatable diaphragm by opening an inlet valve. For example, the inlet valve may receive bleed air from a compressor in a gas turbine engine. In some embodiments, the control system may decrease the pressure within the inflatable diaphragm by opening a release valve. For example, the release valve may release fluid from the inflatable diaphragm to the ambient environment.

Although FIG. 3 illustrates one example method 300 for adjusting an effective area of a jet nozzle, various changes may be made to FIG. 3. For example, while shown as a series of steps, various steps in FIG. 3 could overlap, occur in parallel, occur in a different order, occur any number of times, be omitted, or be replaced by other steps.

In some gas turbine engine applications, such as aircraft, the gas turbine engine may include a set of split duct panels which are extended as part of a thrust reverser feature. In such systems, the effective area of the jet nozzle formed by the split duct panels remains constant when the split duct panels are undeployed as thrust reversers. In such a system, any adjustment of the jet nozzle is provided by a separate mechanism, such as segmented panels, mechanical arms, pivot joints, increasing the weight and cost of the engine system. The present disclosure provides an example split duct panel thrust reverser mechanism that includes an adjustable jet nozzle feature, providing for adjustment of the effective area of the jet nozzle without a separate mechanism when the thrust reverser feature is undeployed.

Figure 4A:
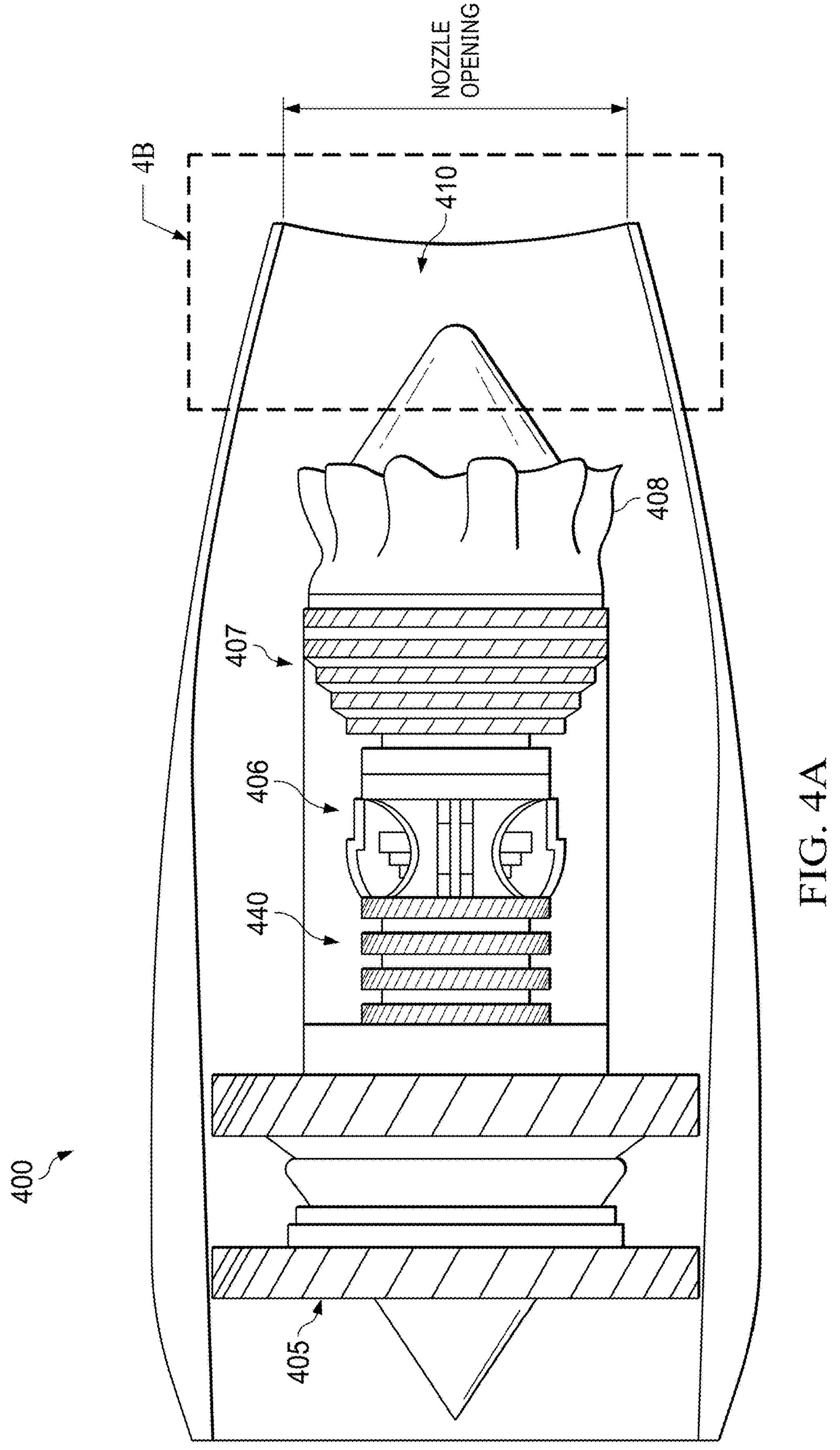
FIGS. 4A-4I illustrate another example gas turbine engine system in accordance with this disclosure.
Figure 4B:
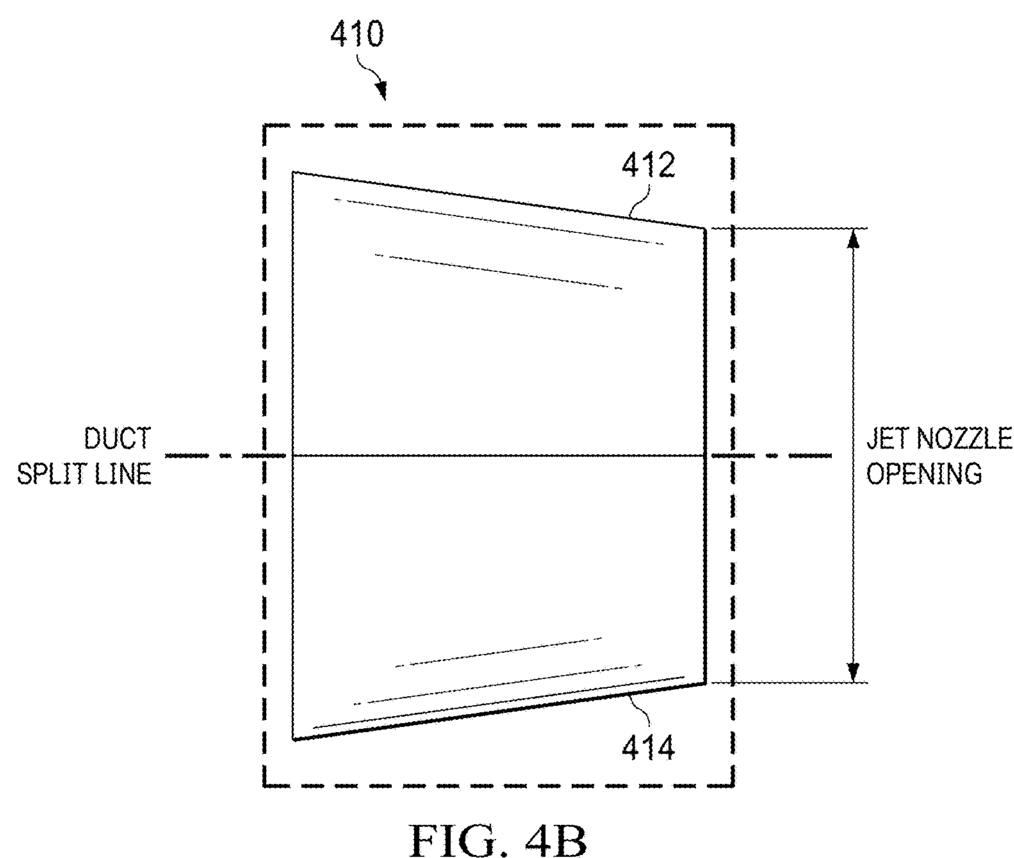
Figure 4C:
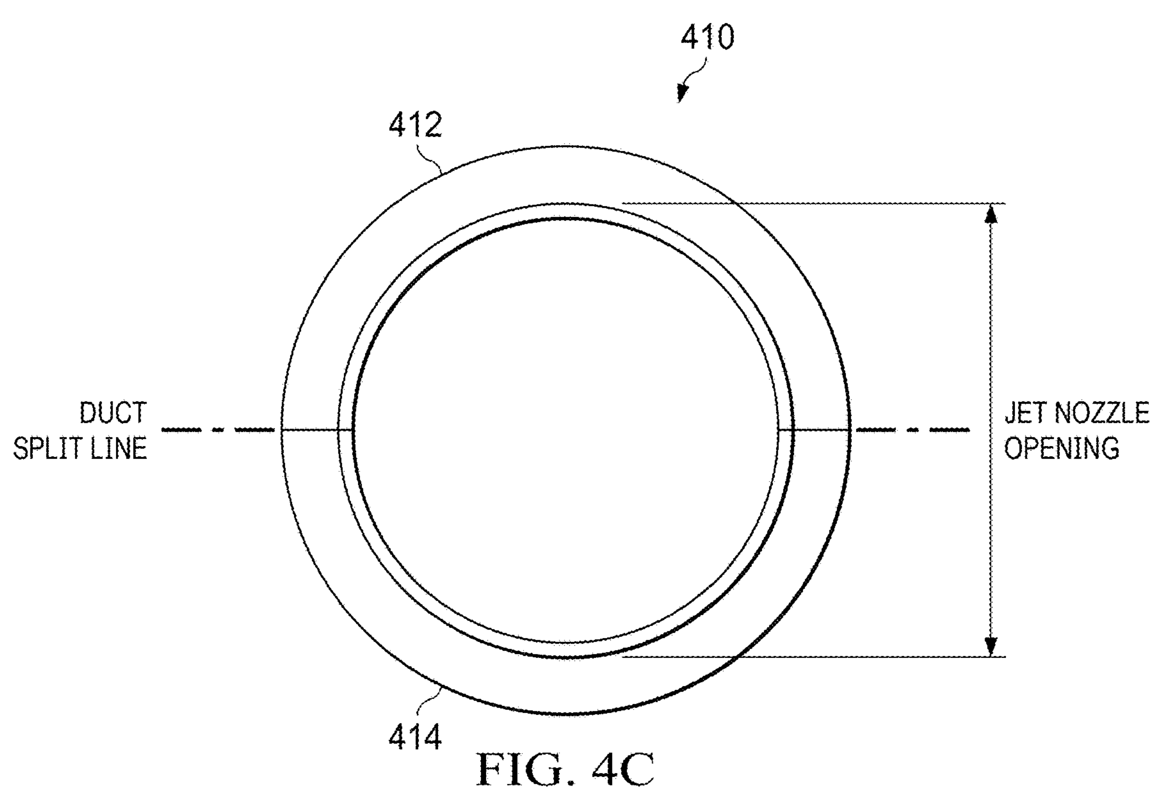
Figure 4D:
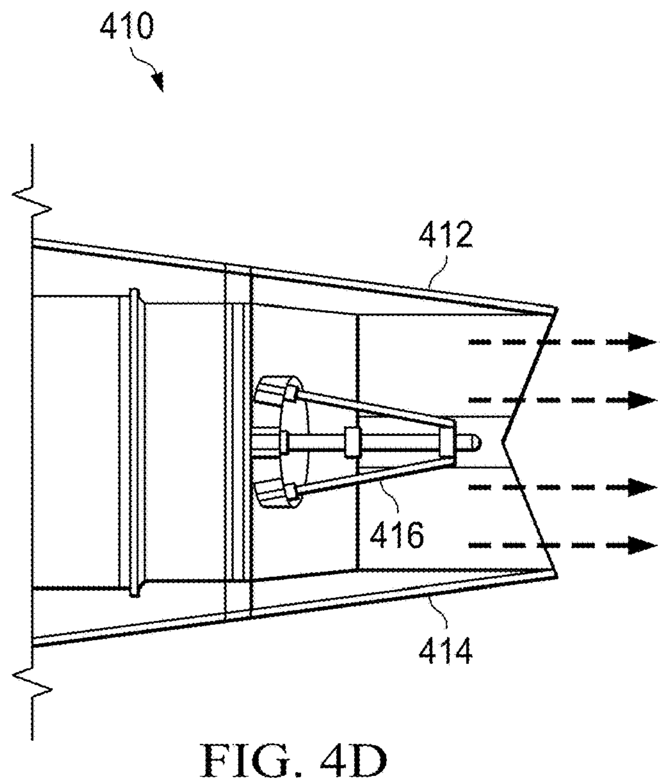
Figure 4E:
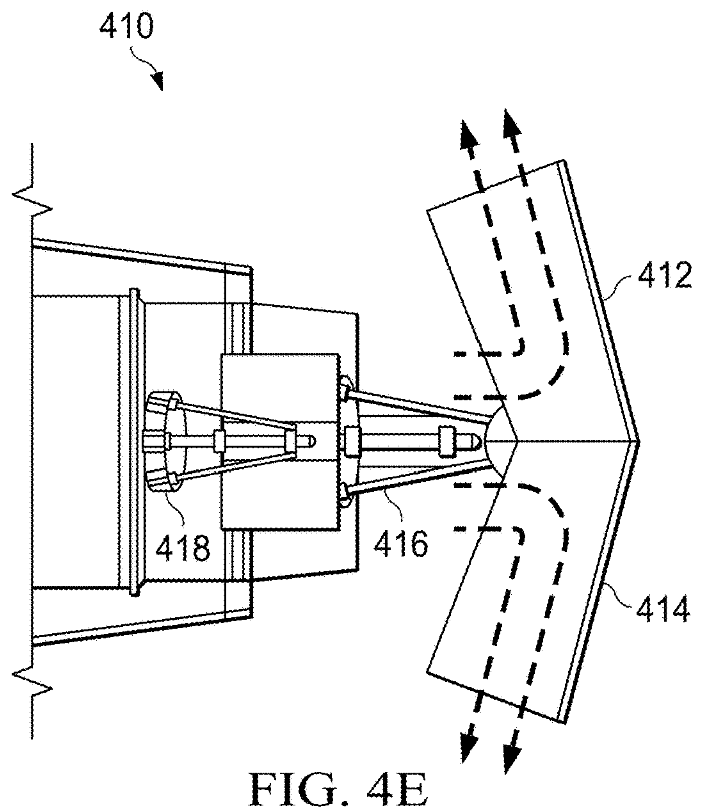

FIGS. 4A-4I illustrate another example aircraft gas turbine engine (e.g., a turbofan engine) system 400 in accordance with this disclosure. It should be understood that the various views of FIGS. 4A-4I omit certain components of system 400 for clarity, but that system 400 may include the aggregate of the components illustrated in FIGS. 4A-4I. As shown in FIGS. 4A-4I, system 400 includes a fan 405, a combustor 406, a turbine 407, a mixer 408, an adjustable effective area jet nozzle 410, and a compressor 440. Jet nozzle 410 includes an upper split duct panel 412, a lower split duct panel 414, and at least one at least one actuator 416 (shown in FIGS. 4D and 4E) configured to position split duct panels 412 and 414. Split duct panels 412 and 414 may also be referred to as bucket doors. In some embodiments, actuator 416 may be a linear variable differential transformer (LVDT) actuator. The at least one actuator 416 may include a positioning feedback sensor, and may be controlled by a control system such as control system 500 of FIG. 5 or control system 600 of FIG. 6. In contrast with existing systems, in which the split duct panels only have one degree of freedom (pivoting), split duct panels 412 and 414 utilize a two degree of freedom motion to provide the effective area reduction and a thrust reverser function, as shown in FIG. 4E. In some embodiments, jet nozzle 410 also includes at least one on/off actuator 418 coupled in series with the at least one actuator 416 (shown in FIG. 4E). Actuator 418 may be operated to fully deploy split duct panels 412 and 414 to operate as a thrust reverser for system 400 independently of the operation of actuator 416. Actuator 418 may be controlled by a control system such as control system 600 of FIG. 6.

Figures 4F, 4G:
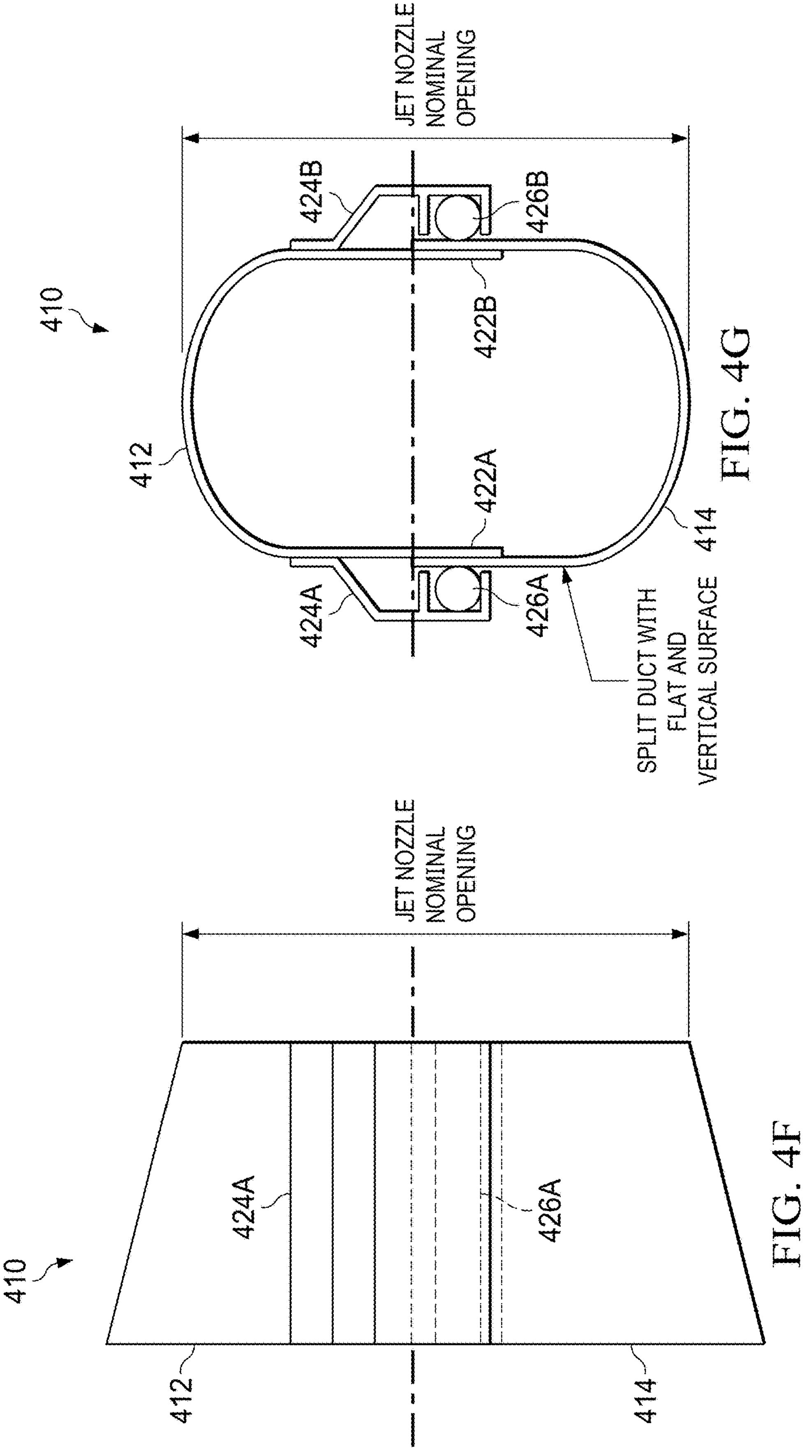
Figure 4I:
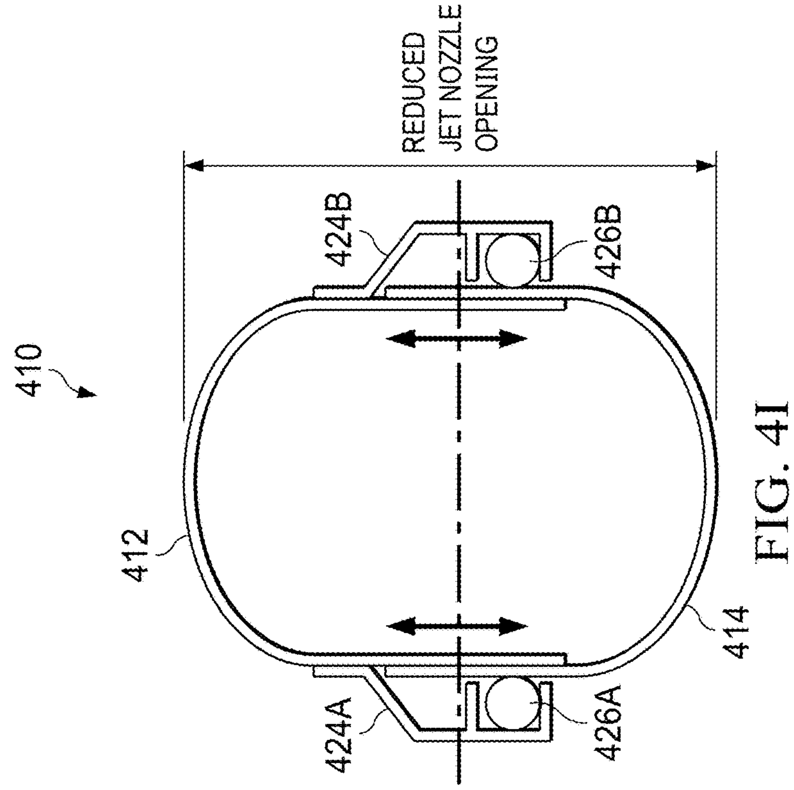
Figure 4H:
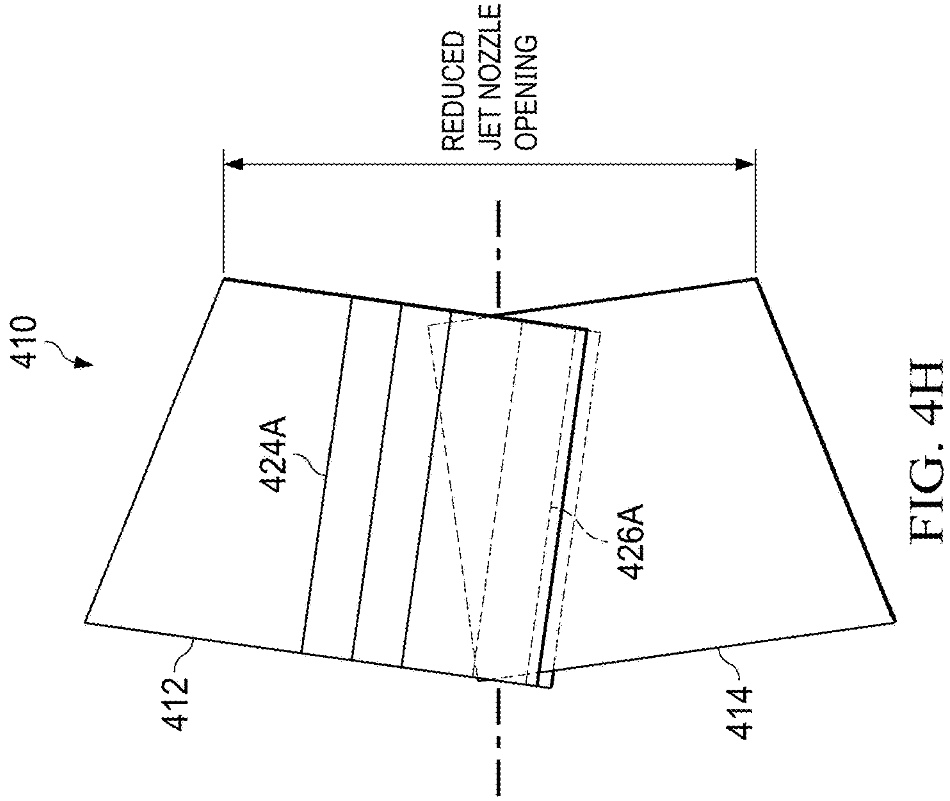

FIG. 4A depicts a cutaway view of system 400. During operation of system 100, fan 405 moves air through a core airflow path and a bypass airflow path that converge at jet nozzle 410. FIGS. 4B, 4D, 4E, 4F 4H depict partial side views of jet nozzle 410. FIGS. 4C, 4G, and 4I depict aft looking forward views of jet nozzle 410. As can be seen in FIGS. 4A-4I, jet nozzle 410 has an adjustable effective area. The effective area of jet nozzle 410 is adjusted by operating actuator 416 to reposition upper split duct panel 412 and lower split duct panel 414. Split duct panels 412 and 414 may be positioned in a nominal position as shown in FIGS. 4B, 4D, 4F, and 4G. In the nominal position, jet nozzle 410 has a nominal effective area. By controlling actuator 416, split duct panels 412 and 414 may be variably repositioned to achieve a reduced effective area ("nozzle opening") such as shown in FIGS. 4H and 4, or variably repositioned to achieve an expanded effective area (not shown). In some embodiments, split duct panels 412 and 414 may be positioned by actuator 416 to provide a thrust reverser feature for system 400 as shown in FIG. 4E.

To provide the adjustable jet nozzle capability for jet nozzle 410, split duct panel 412 is coupled to lower split duct panel 414 with a first overlap joint 422A and a second overlap joint 422B. The overlap joints allow split duct panels 412 and 414 to slide past each other during repositioning. In some embodiments, as shown in FIGS. 4G and 4I, split duct panels 412 and 414 may have flat and vertical surfaces where the overlap joints are formed. In some embodiments, as shown in FIGS. 4F-4I, jet nozzle 410 includes a pair of seal housings 424A and 424B disposed over overlap joints 422A and 422B, stuffed with duct seals 426A and 426B to provide sealing of jet nozzle 410 across the duct split. This improves the efficiency of system 400, as this reduces or eliminates blow by of thrust across the overlap joints.

Although FIGS. 4A-4I illustrate one example of a gas turbine engine system 400, various changes may be made to FIGS. 4A-4I. For example, while illustrated as having particular shapes, split duct panels 412 and 414 may have any shapes.

Figure 5:
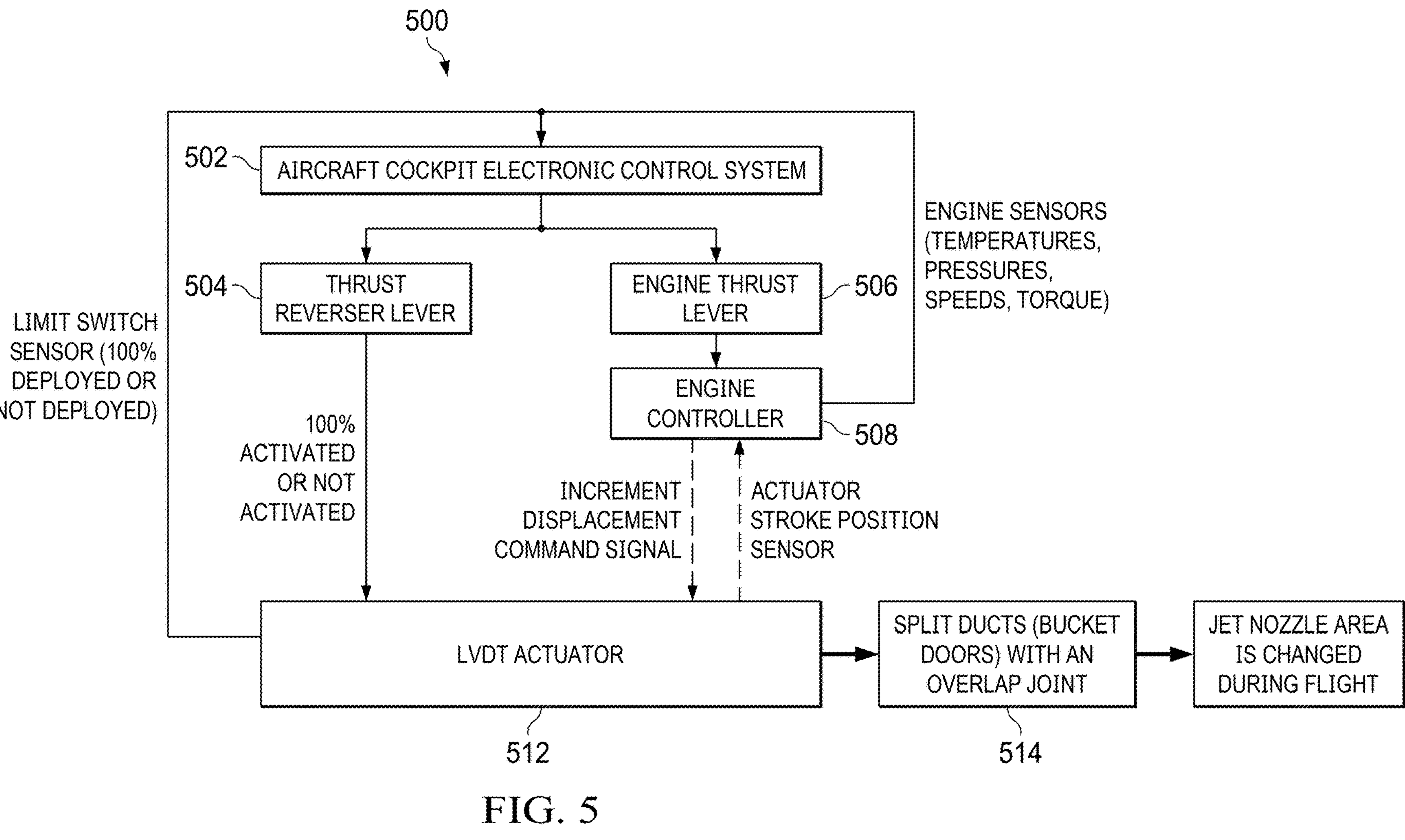
FIG. 5 illustrates an example split duct control system for an aircraft in accordance with this disclosure.

FIG. 5 illustrates a block diagram of an example split duct control system 500 for an aircraft in accordance with this disclosure. For example, split duct control system 500 may be used to control nozzle 410 of gas turbine engine system 400 as illustrated in FIGS. 4A-4I in aircraft applications. In the example of FIG. 5, control system 500 includes an aircraft cockpit electronic control system 502 (hereinafter "cockpit control system" 502). Cockpit control system 502 includes a thrust reverser manual control interface ("thrust reverser lever") 504, and an engine thrust manual control interface ("engine thrust lever") 506. Control interface 504 is directly interfaced with actuator 512, and control interface 506 is indirectly interfaced with actuator 512 via controller 508. While Controller 508 is illustrated as an engine controller, controller 104 may be a full authority digital engine control (FADEC), or any other controller, such as a processor dedicated to controlling the functions of system 600 described herein. Actuator 512 may be an LVDT actuator. During operation of control system 502, for example, during a flight operation, controller 508 receives thrust commands from control interface 506 and position feedback from a position feedback sensor of actuator 512. Based on various parameters, such as the thrust commands from control interface, controller 508 commands actuator 512 to position the split duct panels for a split duct jet nozzle system 514 to adjust the effective area of the jet nozzle. Control logic of controller 508 limits repositioning of the split duct panels by the command signal to within a defined repositioning range. However, if actuator 512 receives a deployment command from control interface 504, e.g., during landing, the deployment command overrides any commands received from controller 508, and actuator 512 deploys the split duct panels of jet nozzle 514 into a thrust reverser mode.

Although FIG. 5 illustrates one example of a split duct control system 500 for an aircraft, various changes may be made to FIG. 5. For example, while illustrated as a thruster reverser lever, thrust reverser manual control interface 504 may be any manual control interface, such as a button, a touch screen, a switch, etc.

Figure 6:
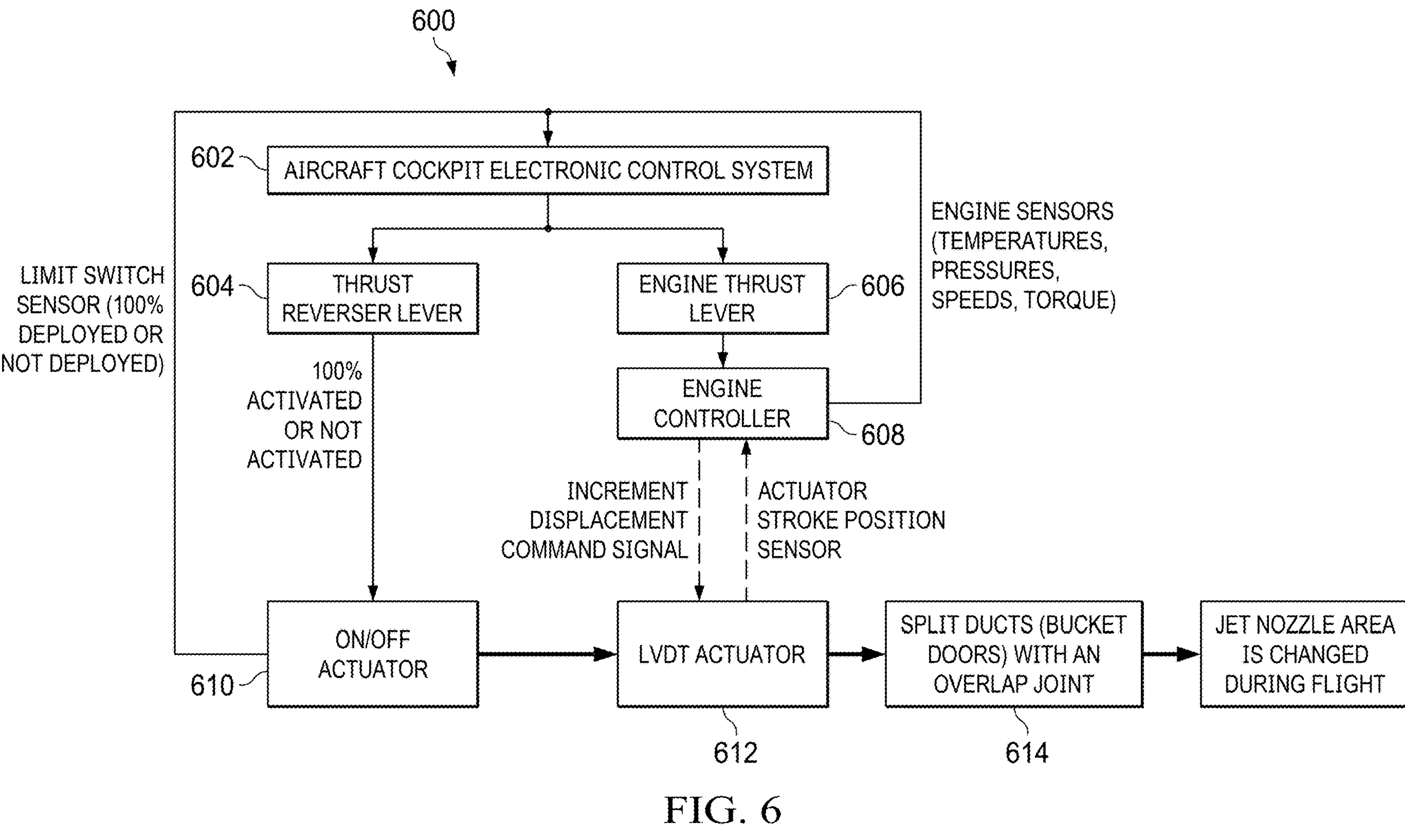
FIG. 6 illustrates another example split duct control system for an aircraft in accordance with this disclosure.

FIG. 6 illustrates a block diagram another example split duct control system 600 for an aircraft in accordance with this disclosure. For example, split duct control system 600 may be used to control nozzle 410 of gas turbine engine system 400 as illustrated in FIGS. 4A-4I in aircraft applications. In the example of FIG. 6, control system 600 includes an aircraft cockpit electronic control system 602 (hereinafter "cockpit control system" 602). Cockpit control system 602 includes a thrust reverser manual control interface ("thrust reverser lever") 604, and an engine thrust manual control interface ("engine thrust lever") 606. Control interface 604 is directly interfaced with on/off actuator 610, and control interface 606 is indirectly interfaced with actuator 612 via controller 608. While Controller 104 is illustrated as an engine controller, controller 608 may be a full authority digital engine control (FADEC), or any other controller, such as a processor dedicated to controlling the functions of system 600 described herein. Actuator 612 may be an LVDT actuator. During operation of control system 602, for example, during a flight operation, controller 608 receives thrust commands from control interface 606 and position feedback from a position feedback sensor of actuator 612. Based on various parameters, such as the thrust commands from control interface, controller 608 commands actuator 612 to position the split duct panels for a split duct jet nozzle system 614 to adjust the effective area of the jet nozzle. Control logic of controller 608 limits repositioning of the split duct panels by the command signal to within a defined repositioning range. If on/off actuator 610 receives a deployment command from control interface 604, e.g., during landing, on/off actuator 610 deploys the split duct panels of jet nozzle 614 into a thrust reverser mode irrespective of any positioning input to jet nozzle 614 by actuator 612.

Although FIG. 6 illustrates one example of a split duct control system 600 for an aircraft, various changes may be made to FIG. 6. For example, while illustrated as a thruster reverser lever, thrust reverser manual control interface 604 may be any manual control interface, such as a button, a touch screen, a switch, etc.

Figure 7:
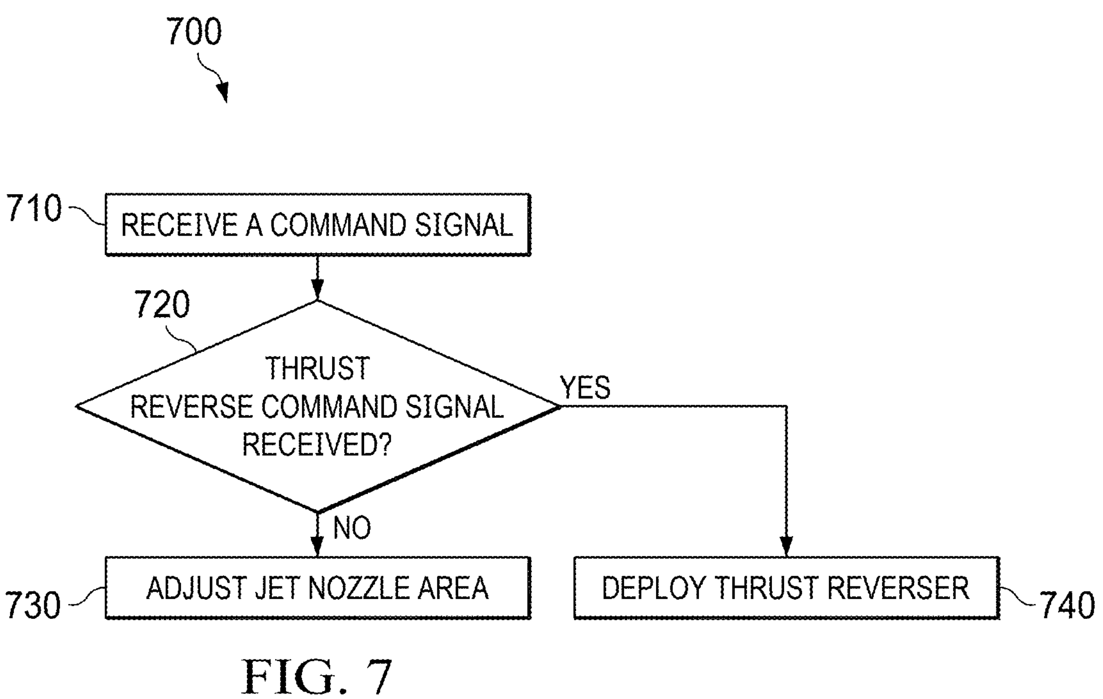
FIG. 7 illustrates an example method for adjusting a split duct jet nozzle effective area in accordance with this disclosure.

FIG. 7 illustrates an example method 700 for adjusting a split duct jet nozzle effective area in accordance with this disclosure. For ease of explanation, the method 700 shown in FIG. 7 may be described as being implemented or supported using a controller. However, the method 700 shown in FIG. 7 may be implemented or supported by any suitable device(s) and in any suitable system(s).

In the example of FIG. 7 method 700 begins at step 710. At step 710, a control system for a split duct jet nozzle for a gas turbine engine, such as jet nozzle 410 of FIGS. 4A-4I receives a command signal. For example, the control system for the jet nozzle may receive the command signal from a controller such as controller 508 of FIG. 5 or controller 608 of FIG. 6. In some embodiments, the command signal may be received in response to an event. For example, in some embodiments the command signal may be received in response to detection of a cruise operating condition. In another example, in some embodiments, the command signal may be received in response to detection of a non-cruise operating condition. In some embodiments, the command signal may include a command to reduce the effective area of the jet nozzle or increase the effective area of the jet nozzle.

At step 720, if a thrust reverser deployment command has been received (e.g., from thrust reverser manual control interface 504 if FIG. 5 or thrust reverser manual control interface 604 of FIG. 6), the method proceeds to step 740. Otherwise, the method proceeds to step 730.

At step 730, in response to receiving the command signal, the control system adjusts the position of split duct panels of the split duct jet nozzle to adjust the effective area of the jet nozzle. For example, the control system may position the split duct panels to reduce the effective area of the jet nozzle, or position to the split duct panels to increase the effective area of the jet nozzle. Control logic of the control system prevents the command signal from adjusting the position of the split duct panels beyond a defined range.

At step 740, the control system positions the split duct panels into a thrust reverser mode to reverse the thrust of the engine.

Although FIG. 7 illustrates one example method 700 for adjusting a split duct jet nozzle effective area, various changes may be made to FIG. 7. For example, while shown as a series of steps, various steps in FIG. 7 could overlap, occur in parallel, occur in a different order, occur any number of times, be omitted, or be replaced by other steps.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S. C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S. C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A gas turbine engine for an aircraft comprising:

an outer bypass section wall surrounding a core engine, wherein the core engine comprises a core exhaust mixer;

a jet nozzle positioned downstream of the core exhaust mixer, the jet nozzle including:

at least one inflatable diaphragm, the at least one inflatable diaphragm disposed along the outer bypass section wall; and a plurality of hinged panels disposed adjacent to the at least one inflatable diaphragm along the outer bypass section wall, wherein each hinged panel from the plurality of hinged panels is configured to seat entirely within a recess defined within the outer bypass section wall when the plurality of hinged panels is retracted from the jet nozzle and to extend out of the recess into the jet nozzle when the plurality of hinged panels is deployed;

a fluid pressure sensor configured to measure a fluid pressure within the at least one inflatable diaphragm;

an inlet valve configured to control a pressurized flow of a fluid into the at least one inflatable diaphragm in response to a command from a controller; and a release valve configured to control a release of the fluid from within the at least one inflatable diaphragm in response to a command from the controller, wherein the at least one inflatable diaphragm is configured to:

expand into the jet nozzle when the fluid pressure within the at least one inflatable diaphragm is increased such that an effective area of the jet nozzle is reduced; and recede from the jet nozzle when the fluid pressure within the at least one inflatable diaphragm is decreased such that the effective area of the jet nozzle is increased.

2. The gas turbine engine of claim 1, wherein:

the fluid is compressed air; and the inlet valve is fluidly connected to receive the compressed air from a compressor of the gas turbine engine.

3. The gas turbine engine of claim 1, wherein the at least one inflatable diaphragm is a single inflatable diaphragm having an annular shape.

4. The gas turbine engine of claim 1, wherein the at least one inflatable diaphragm is disposed along a non-moving surface of the outer bypass section wall.

5. The gas turbine engine of claim 1, wherein the at least one inflatable diaphragm is configured to deploy the plurality of hinged panels into the jet nozzle when the fluid pressure within the at least one inflatable diaphragm is increased such that an effective area of the jet nozzle is reduced.

6. The gas turbine engine of claim 5, wherein:

each hinged panel from the plurality of hinged panels has a tapered shape; and each hinged panel from the plurality of hinged panels is configured to contact adjacent hinged panels from the plurality of hinged panels when the plurality of hinged panels is deployed within the jet nozzle.

7. The gas turbine engine of claim 1, wherein the at least one inflatable diaphragm is configured to retract the plurality of hinged panels from the jet nozzle when the fluid pressure within the at least one inflatable diaphragm is decreased such that an effective area of the jet nozzle is increased.

8. The gas turbine engine of claim 1, wherein each hinged panel from the plurality of hinged panels is hinged with a sprung hinge.

9. The gas turbine engine of claim 1, wherein the at least one inflatable diaphragm is configured to provide even pressure to each panel from the plurality of hinged panels.

10. A jet nozzle for a gas turbine engine for an aircraft, the gas turbine engine having a core engine with a core exhaust mixer, the jet nozzle comprising:

at least one inflatable diaphragm configured to be disposed along an outer bypass section wall of the gas turbine engine surrounding the core engine; and a plurality of panels configured to be hinged along the outer bypass section wall of the gas turbine engine adjacent to the at least one inflatable diaphragm, wherein each panel from the plurality of panels is configured to seat entirely within a recess defined within the outer bypass section wall when the plurality of panels is retracted from the jet nozzle and to extend out of the recess into the jet nozzle when the plurality of hinged panels is deployed, and wherein the at least one inflatable diaphragm is further configured to:

couple with a fluid pressure sensor configured to measure a fluid pressure within the at least one inflatable diaphragm;

couple with an inlet valve configured to control a pressurized flow of a fluid into the at least one inflatable diaphragm in response to a command from a controller; and couple with a release valve configured to control a release of the fluid from within the at least one inflatable diaphragm in response to a command from the controller, wherein the at least one inflatable diaphragm is configured to:

expand into the jet nozzle when the fluid pressure within the at least one inflatable diaphragm is increased such that an effective area of the jet nozzle is reduced; and recede from the jet nozzle when the fluid pressure within the at least one inflatable diaphragm is decreased such that the effective area of the jet nozzle is increased; and wherein the jet nozzle is positioned downstream of the core exhaust mixer.

11. The jet nozzle of claim 10, wherein:

the fluid is compressed air; and the at least one inflatable diaphragm is configured to receive the compressed air, via the inlet valve, from a compressor of the gas turbine engine.

12. The jet nozzle of claim 10, wherein the at least one inflatable diaphragm is a single inflatable diaphragm having an annular shape.

13. The jet nozzle of claim 10, wherein the at least one inflatable diaphragm is configured to be disposed along a non-moving surface of the outer bypass section wall.

14. The jet nozzle of claim 10, wherein the at least one inflatable diaphragm is configured to deploy the plurality of panels into the jet nozzle when the fluid pressure within the at least one inflatable diaphragm is increased such that an effective area of the jet nozzle is reduced.

15. The jet nozzle of claim 14, wherein:

each panel from the plurality of panels has a tapered shape; and each panel from the plurality of panels is configured to contact adjacent panels from the plurality of panels when the plurality of panels is deployed into the jet nozzle.

16. The jet nozzle of claim 10, wherein the at least one inflatable diaphragm is configured to retract the plurality of panels from the jet nozzle when the fluid pressure within the at least one inflatable diaphragm is decreased such that an effective area of the jet nozzle is increased.

17. The jet nozzle of claim 10, wherein each of the plurality of panels is configured to be hinged along the outer bypass section wall of the gas turbine engine with a sprung hinge.

18. The jet nozzle of claim 10, wherein the at least one inflatable diaphragm is configured to provide even pressure to each panel from the plurality of panels.

* * * * *